United States Patent Office 2,705,076
Patented Mar. 29, 1955

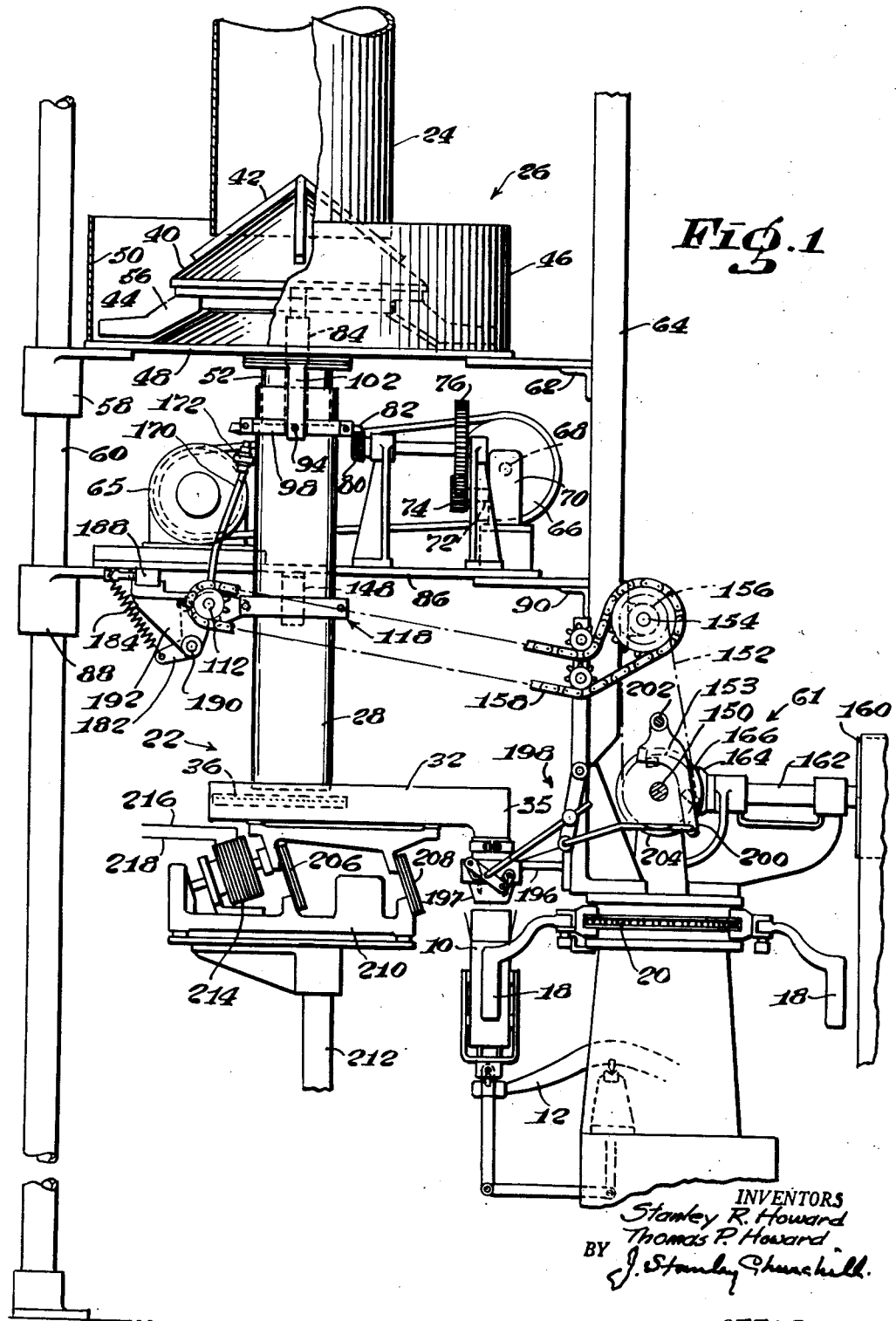

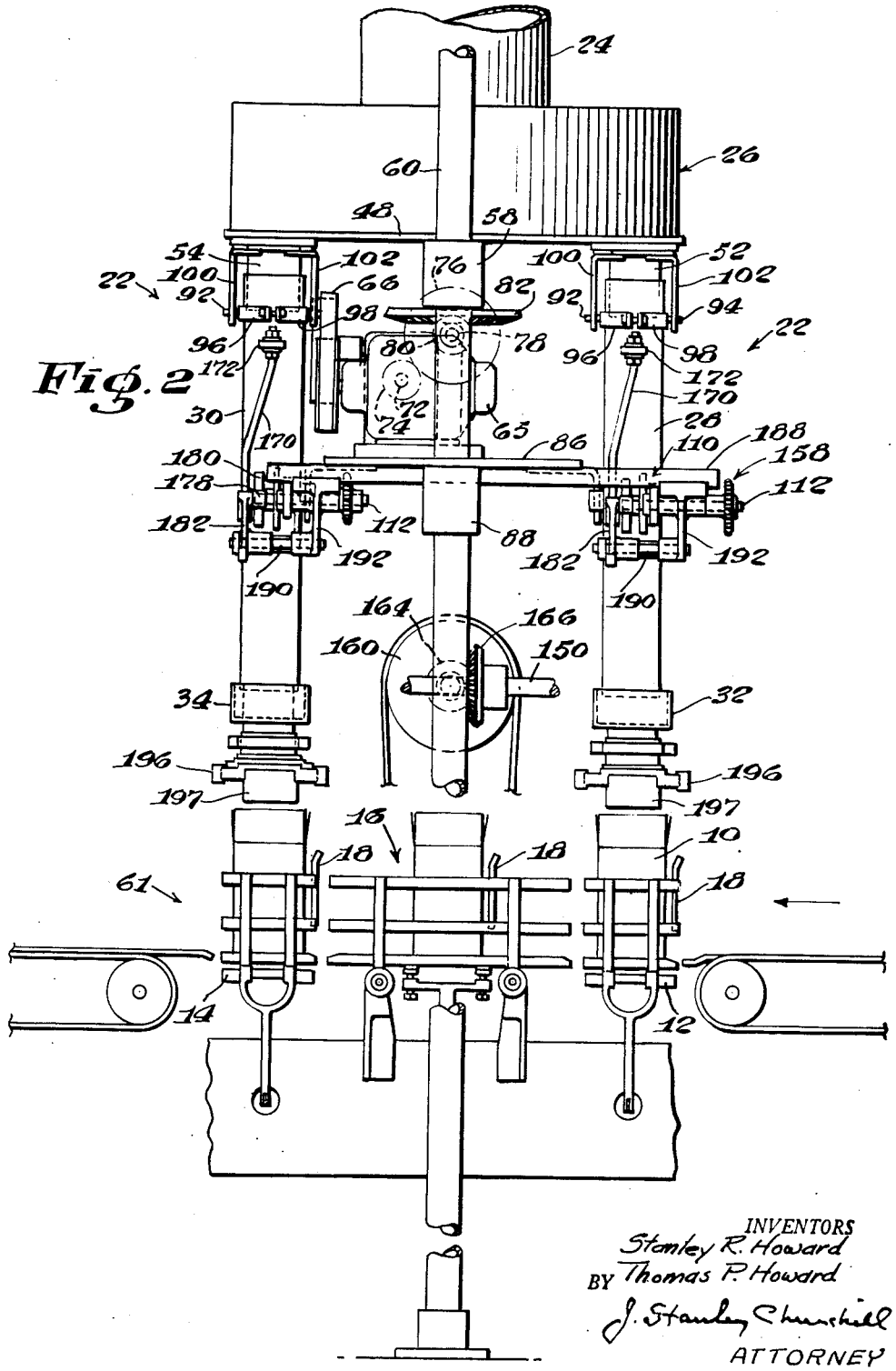

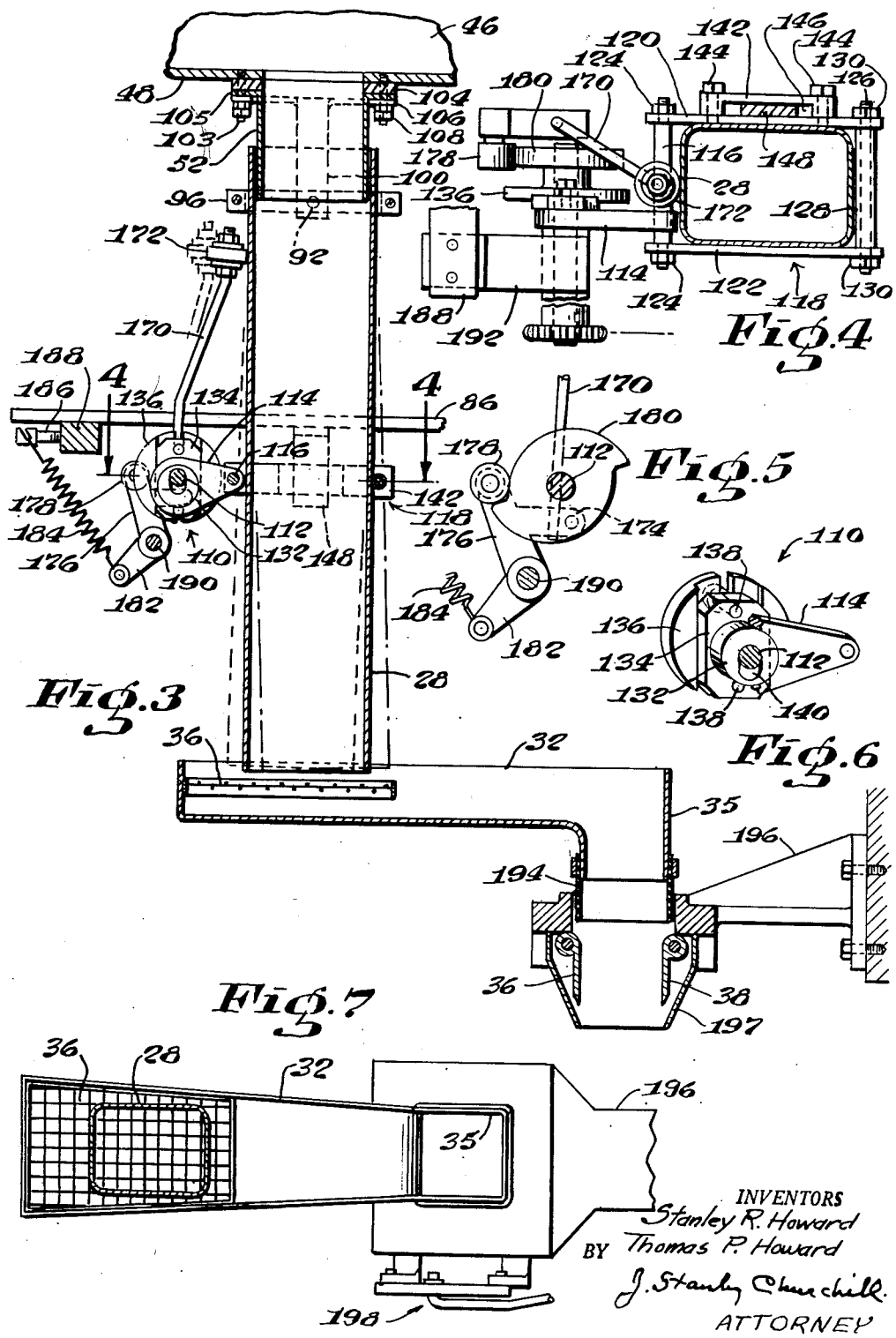

2,705,076
MATERIAL FEEDING MECHANISM

Stanley R. Howard and Thomas P. Howard, Milton, Mass., assignors to Pneumatic Scale Corporation, Limited, Quincy, Mass., a corporation of Massachusetts Application May 19, 1951, Serial No. 227,230

1 Claim. (Cl. 209—244)

This invention relates to a material feeding mechanism.

The invention has for an object to provide a novel and improved material feeding mechanism embodying a novel and highly efficient material-feeding apparatus particularly adapted for efficiently feeding in a uniform stream certain types of non-freely flowing finely divided materials, such as prepared pie-crust mixtures.

With this general object in view, and such others as may hereinafter appear, the invention consists in the material feeding mechanism and in the various structures, arrangements, and combinations of parts hereinafter described and particularly defined in the claim at the end of this specification.

In the drawings illustrating the preferred embodiment of the invention, Fig. 1 is a side elevation of a weighing machine embodying the present invention; Fig. 2 is a front elevation of the same; Fig. 3 is a cross-sectional view of the material-feeding apparatus; Fig. 4 is a plan view in cross section taken on the line 4—4 of Fig. 3; Fig. 5 is a detail view in side elevation of a cam and associated mechanism shown in Fig. 3; Fig. 6 is a perspective view of crank mechanism shown in Fig. 3; and Fig. 7 is a plan view of the lower portion of the feeding apparatus shown in Fig. 3.

In general, the present invention contemplates a novel and improved weighing machine embodying material-feeding apparatus of novel construction particularly adapted for feeding materials which flow with difficulty and which also have an inherent tendency to pack and adhere to the surfaces over which they are guided into the packages to be filled. Illustrative of such a class of materials is a commercially prepared pie-crust mixture having as principal ingredients flour and shortening. Such materials cannot be successfully handled in the conventional constructions of feeding mechanisms heretofore used in weighing machines for freely-flowing materials, and as a result it has been found difficult to obtain acceptable precision in weighing such materials.

In accordance with one feature of the invention, provision is made in the present weighing machine for feeding the material by gravity from a source of supply through an elongated funnel pivoted at its upper end and arranged to be oscillated to cause the lower end of the column of material in the elongated funnel to be rubbed against a sieve or wire mesh screen carried by and movable with a horizontal vibratory conduit or feeder arranged to discharge the material from the delivery end of the conduit into a carbon supported on the scale beam of a weighing machine. As a result of the combined oscillatory movement of the funnel and vibratory movement of the screen the material is caused to be uniformly withdrawn from the funnel and separated into relatively small particles which are advanced along the vibratory conduit to be discharged and deposited into the carton in a substantially uniform stream conducive to accurate weighing operations.

In accordance with another feature of the invention, conducive to more accurate weighing performance, provision is made for guiding the material, during its advance through the horizontal vibratory conduit, from a relatively wide and shallow stream to a relatively narrower and deeper stream of a cross-sectional area such as to permit direct entry from the discharge end of the vibratory conduit into the mouth of the carton on the scale beam, the discharge end of the conduit being provided with a relatively short spout carried by and vibrated with the conduit for guiding the material into the mouth of the carton. As a result of such structure, the usual shutters for interrupting the flow of the material at the end of the weighing operation may be placed relatively close to the discharge end of the funnel, and the material discharged from the conduit is permitted to fall through a relatively short distance, thus reducing the impact on the scale beam and also rendering the impact more constant and uniform resulting in more accurate weighing performance. Furthermore, the expedient of shaping the stream while being advanced along the vibratory conduit to a size or cross-sectional area to permit it to flow directly into the mouth of the carton effects a faster and more uniform rate of flow into the carton, and the amount of material suspended in the air between the discharge end of the conduit and the shutter is materially reduced so that a relatively small amount of material is accumulated above the shutters at the end of the weighing operation.

In practice, the material-delivery funnels may be oscillated fairly rapidly, approximately in the order of 250 to 300 oscillations per minute to reduce the tendency of the material to adhere to the side walls of the funnels, and the vibratory conduit carrying the sieve for cooperation with the material emerging from the funnel may and preferably will be operated at high frequency so as to prevent the sieve from becoming plugged during the operation of the machine. Provision may also be made for tapping the side walls of the material-delivery funnels in order to assist in maintaining a free flow of the material therethrough and to prevent adherence of the material to the side walls.

Referring now to the drawings, the invention is illustrated as embodied in a two-scale weighing machine which, except as hereinafter pointed out, may comprise the two-scale weighing machine of the type illustrated and described in the United States patent to S. R. Howard, No. 1,724,591, August 13, 1929. Only sufficient portions of the complete weighing machine have been herein illustrated and will be described as appear to be necessary for a complete understanding of the present invention.

In general, in the operation of such prior two-scale weighing machines, a bulk or primary load is introduced into a carton 10 on a scale beam 12 at the first weighing station, and a drip or final load is introduced into the carton on a second scale beam 14 at the second weighing station, the usual material-settling station 16 being provided between the first and second weighing stations. Such prior weighing machines are further adapted to operate in successive cycles wherein the weighing operation is performed during one-half cycle of operation, and when the scales have completed their weighing operations, the second half cycle of operation is initiated during which the cartons are intermittently advanced one station of operation by conveyer mechanism herein illustrated as including a series of carrier arms 18 attached to an endless chain 20.

As illustrated in Figs. 1 and 2, each material-feeding unit of such a two-scale weighing machine is preferably provided with an improved feeding mechanism indicated generally at 22 and which in general comprises a supply hopper 24 and a conical rotary material-feeding and distributing apparatus 26 arranged to withdraw material from the supply hopper and to deposit the material in a loose and free-flowing condition into elongated oscillatory material-delivery funnels 28, 30 arranged to deliver the material to horizontal vibratory feed conduits 32, 34 of the bulk and drip-load weighing units respectively. The lower end of each oscillating funnel is disposed adjacent a relatively coarse sieve or wire mesh screen 36a carried by and movable with the vibratory conduit and which operates to separate the material withdrawn from the mouth of the funnel and to sift the material onto the platform of the vibratory conduit. As herein shown, the vibratory conduit is provided with a relatively short spout 35 arranged to guide the material into a carton on the scale beam, and a pair of shutters 36, 38 supported immediately below the discharge spout 35 are arranged to be closed to interrupt the stream of material at the end of the carton-filling operation.

It will be understood that suitable provision is also made for controlling the operation of the machine so that the carton-moving period of operation cannot start until both scales have completed their independent weighing operations, all as fully described in the Howard Patent No. 1,724,591 to which reference is made.

In practice, any usual or preferred form of mechanism 26 may be provided for initially withdrawing the material from the mouth of the supply hopper 24 and introducing the material into the oscillating funnels 28, 30, the illustrated material-withdrawing and distributing apparatus comprising the supply hopper through which the material may flow by gravity from a source of supply, and a rotatable feed cone 40 provided on its conical surface with a plurality of radial vanes 42. The small end of the feed cone is mounted to extend upwardly into the end of the hopper to effect a slight agitation and loosening of the material at the mouth of the supply hopper causing the material to spread out loosely and evenly as it flows by gravity down the surface and from the base of the feed cone.

In operation, the separated material flowing from the base of the feed cone is received in an annular chamber 44 defined by a cylindrical drum 46 open at the top and having a bottom wall 48 and having an upstanding rim portion 50 spaced from and surrounding the feed cone 40. The bottom wall 48 of the drum is provided with discharge openings communicating with depending sleeves 52, 54 attached to the bottom wall 48 and extending into the upper ends of the oscillating funnels 28, 30 respectively. The material delivered to the annular chamber 44 is conveyed in a circular path through the chamber by a plurality of radially extended pusher arms 56 arranged to rotate with the feed cone and to carry the material to the discharge openings where it falls by gravity into oscillating delivery funnels 28, 30.

As shown in Fig. 1, the cylindrical drum 46 may be supported from the framework of the apparatus by a bracket 58 extending from a vertical standard 60, and a bracket 62 secured to a frame member 64 attached to the platen of the two-scale weighing machine indicated generally at 61. Provision is made for rotating the feed cone 40 and the pusher arms 56 at a relatively slow rate of speed approximately in the order of four or five revolutions per minute through connections from an electric motor 65 belted to a pulley 66 fast on a shaft 68 comprising the input shaft of a worm-gear reduction unit 70. The output shaft 72 is provided with a pinion 74 meshing with a gear 76 mounted on a drive shaft 78, the latter being provided with a bevel pinion 80 arranged to mesh with a bevel gear 82 secured to the lower end of a vertical shaft 84 to which the rotary cone 40 and the pusher arms 56 are connected. The driving mechanism for the cone feeder may be mounted on a platen 86 supported from the frame of the machine by brackets 88 and 90 as illustrated.

From the description thus far it will be observed that the material may be gently and uniformly fed in a loose and free-flowing condition and at a substantially constant rate from the supply hopper 24 to the oscillating delivery funnels 28, 30 for delivery to the bulk and drip units of a two-scale weighing machine. As herein shown, the upper end of each oscillating delivery funnel is pivotally mounted on pins 92, 94 secured to and laterally extended from opposed strap members 96, 98 clamped about the funnel, as illustrated. The pins 92, 94 are pivotally supported in opposed brackets 100, 102 secured to the underside of the bottom wall 48 of the drum 46 by bolts 103 threadedly engaged with and depending from the bottom wall 48. As shown in detail in Fig. 3, the bolts 103 extend through a spacer 104, flanges 105 of the depending sleeve 52 and through the horizontally extended arms 106 of the opposed brackets 100, 102, the parts being detachably held in assembled relation by lock nuts 108.

The mechanism for oscillating each delivery funnel 28, 30 comprises a crank or eccentric device, indicated generally at 110 and mounted on a shaft 112. The eccentric device is connected by a follower link 114 to a rod 116 forming part of a frame 118 clamped about an intermediate portion of the elongated delivery funnel. As herein shown, the frame 118 includes opposed strap members 120, 122 embracing opposite sides of the funnel and connected together on one side by the rod 116 having threaded ends extended through the straps for cooperation with nuts 124, and connected together on the other side by a through bolt 126, spacing sleeve 128 and nuts 130. The follower link 114 is connected to an eccentric hub 132 extended from a flange portion 134 adjustably secured in a grooved and slotted disk 136 by bolts 138. The disk 136 is fast on the shaft 112, and the eccentric hub 132 is provided with a slot 140 to permit adjustment of the eccentric in the groove toward and from the center of the shaft whereby to enable the stroke of the eccentric or amplitude of oscillation to be varied as desired for most efficient operation. A bracket 142 connected by bolts 144 to one side strap 120 of the frame 118 is shaped with a slotted opening 146 arranged to slidingly receive a vertical guide bar 148 attached to and depending from the platen 86 in order to steady the funnel and to prevent lateral displacement in a direction at right angles to the oscillating movement.

The shaft 112 on which the eccentric mechanism is mounted is arranged to be rotated through connections from the main driving shaft 150 of the weighing machine including a chain and sprocket drive 152 connected between the main driving shaft and an intermediate shaft 154 supported in a bracket 156 attached to the frame member 64, and a second chain and sprocket drive 158 connects the intermediate shaft 154 to the shaft 112. As herein shown, the main driving shaft 112 is arranged to be driven from a driving pulley 160 on a shaft 162 and through bevel gears 164, 166. Thus, during the operation of the weighing machine, the funnels 28, 30 are oscillated to effect rubbing of the bottom of the column of material against the wire mesh sieve 36a supported in and vibrated with the vibratory conduit 32 whereby to separate the material into relatively small particles and to sift it through the sieve to be guided into a carton to be filled.

In practice, the delivery funnels are oscillated in timed relation to the operation of the weighing machine, and the oscillation is preferably controlled by the weighing machine to effect oscillation of the funnels during the weighing period of operation and to discontinue oscillation of the funnels during the carton-moving period of operation, the operation of the machine being controlled by the scale beam, as described in said Howard Patent No. 1,724,591. In the operation of the present machine, oscillation of the delivery funnels is effected only during the weighing period of operation through the usual clutch mechanism, not shown, the driven member of which comprises the sprocket 153 of the chain and sprocket drive 152. The sprocket 153 is loosely mounted on the main driving shaft 150 and is arranged to be engaged and disengaged to start and stop the oscillation of the funnels through the usual control mechanism and connections shown in the Howard Patent No. 1,724,591.

Provision may also be made in the preferred embodiment of the invention for tapping the side walls of the material-delivery funnels 28, 30 during the oscillation thereof to assist in maintaining a free flow of the material through the funnels and to prevent material from adhering to the side walls thereof. As herein shown, each tapping mechanism may comprise a cam-operated rod 170 having a roller 172 secured to the free end thereof for tapping engagement with a side wall of the funnel adjacent the upper end thereof. The other end of the rod 170 may be adjustably clamped to an extension 174 of one arm 176 of a cam lever having a cam roll 178 arranged to cooperate with a cam 180 fast on the shaft 112. The other arm 182 of the cam lever is provided with a spring 184 connected to a stud 186 fixed in a block 188 attached to the underside of the platen 86. As herein shown, the cam lever may be pivotally mounted on a rocker shaft 190 supported in a bracket 192 secured to the block 188.

As illustrated in Figs. 3 and 7, the sieve 36a is disposed at the receiving end of the vibratory conduit 32 and may be secured to the side walls thereof intermediate the upper edges of the side walls and the bottom wall of the conduit in order to confine the material within the conduit and providing a sufficient space below the sieve to permit a free flow of the sifted material along the bottom wall of the vibratory conduit. As shown in Fig. 3, the lower end of the delivery funnel may be spaced slightly above the sieve so as to effect a rubbing action of the lower end of the column of material against the vibratory sieve 36a during the operation of the machine. The mesh of the wire sieve 36a is selected with relation to the consistency and packing characteristics of the material being weighed. In practice, sieves having openings between ¼ to ¾ of an inch have been found satisfactory.

As shown in Fig. 7, the side walls of the vibratory conduit are tapered toward the discharge end thereof in order to narrow the stream of material as it is being advanced to a size for delivery into the carton supported on the scale beam, and the integral spout portion 35 is arranged to guide the material downwardly in the carton during the vibration of the conduit. As herein shown, the spout 35 may be provided with a skirt 194 of flexible sheet material, such as rubber, the lower end of the skirt extending loosely into an opening in the upper end of a bracket 196 attached to and extending from the frame of the weighing machine and in which the shutters 36, 38 are pivotally supported. The bracket 196 is also provided with a spout portion 197 for guiding the material into the mouth of the carton. As illustrated in Fig. 1, provision is made for opening and closing the shutters in timed relation to the operation of the weighing machine to cut off the flow of material at the end of each weighing operation and to permit the flow of the material into the carton during the weighing operation. The shutters 36, 38 may be connected by linkage, indicated generally at 198, to a yoke arm 200 pivotally mounted at 202 and which forms a part of the usual control mechanism for shutter operation in a two-scale weighing machine as shown in the Howard Patent No. 1,724,591 to which reference may be had.

In the operation of such shutter mechanism, the yoke arm 200 is arranged to be rocked in one direction to open the shutters and in the opposite direction to close the shutters by a cam disk 204 loosely mounted on the main driving shaft 150, the cam disk being permitted to rotate in successive half revolutions at the start and end of each weighing period through mechanism controlled by the operation of the scale beam when the scale makes its weight and through suitable resetting mechanism, all as shown and described in the Howard patent above referred to.

The vibratory feed conduit 32, as shown in Fig. 1, is supported by flexible straps 206, 208 attached to a base member 210 which is supported from the floor by a standard 212, and the conduit is arranged to be operated by a vibratory motor 214 supported on the base member 210. The vibratory motor may be provided with leads 216, 218 which may be included in a circuit, not shown, for starting and stopping the vibratory motor in timed relation to the weighing machine so as to discontinue vibration of the conduit and feeding of the material at the end of the weighing operation. Such circuit may include a mercury switch carried by or connected to the shutter linkage 198 and arranged to open the circuit to the vibratory motor 214 when the shutters are closed, and conversely, to again close the circuit when the shutters are opened. Thus, during the operation of the machine, the circuit to the vibratory motor may be opened and closed simultaneously with the opening and closing of the shutters so as to effect vibration of the conduit only during the weighing period in the operation of the machine.

In the operation of the two-scale weighing machine when the cartons come to rest on the scale beams at the end of a carton-moving period of operation, the material-delivery funnels 28, 30 are oscillated; vibration of the conduits 32, 34 is initiated; and the shutters 36, 38 are opened to permit the material to flow into the cartons to form the bulk load in one carton and to deposit the drip load in the other carton. Thereafter, when the cartons are filled and both scales have made their weight, the oscillation of the funnels is discontinued; vibration of the conduits is stopped; and the shutters are closed, and when the streams are cut off by the shutters at the end of the weighing operation, the surplus material suspended in the air between the discharge end of the conduits and the shutters is accumulated above the shutters to be released into the next cartons during the succeeding weighing operation.

In practice, the shutters are placed as close to the mouth of the carton as is practicable so as to reduce to a minimum the amount of material suspended in the air between the shutters and the mouth of the carton when the stream is interrupted. Prior to the present invention, conventional practice required a relatively long tapering funnel for guiding the material from the discharge end of the conduit into the mouth of the carton so that the material was required to fall through a relatively long distance from the discharge end of the vibratory conduit or other feeding device into the carton. In practice, the impact of the material falling through such long distance onto the scale beam was relatively great and materially affected the accuracy of the weight obtained, and in addition, some of the falling material striking the sides of the elongated tapering funnel would be reduced in speed so that the impact of the material onto the scale beam would be varied thus causing irregular weighing performance. Furthermore, when the stream was cut off in such prior weighing machines the relatively long stream of material suspended in the air between the discharge point and the shutters caused a relatively large amount of material to be accumulated above the shutters which tended to pack and bridge across the end of the funnel.

It will be observed that the present structure of material-feeding apparatus is arranged to shape the stream to a size for direct entry into the carton while being advanced along the horizontal vibratory conduit thus permitting the material to fall through a relatively short distance into the carton, assuring a more uniform impact upon the scale beam and affording a faster and more uniform rate of flow into the carton. Furthermore, the amount of material suspended in the air between the conduit and the shutters is materially reduced so that a relatively small amount of the material is accumulated above the shutters at the end of the weighing operation, thus reducing the tendency of the material to pack and bridge above the shutters. As a further result of the increased accuracy in the weighing operation in the present weighing machine, it has been found that the bulk-load scale beam may be adjusted to weigh a greater proportion of the predetermined completed weight than formerly, thus requiring less material to be deposited into the carton at the drip station to bring the carton up to the predetermined weight.

During the material-feeding operation, the oscillating funnels may be rocked from the dotted-line position to the broken-line position, as indicated in Fig. 3, to rub the material emerging from the funnels against the vibratory sieve 36a, thus producing an abrading action and effecting comminution and dispersion of the material until it falls through the sieve to form a free-flowing and substantially uniform stream conducive to accurate weighing. In practice, the high-frequency vibration of the sieve prevents plugging of the openings therein to assure uniformity in the stream delivered to the vibratory conduit. The distance between the end of the funnel and the sieve may vary with different classes and consistencies of materials, and the wire mesh openings may be varied in size to suit the particular material being fed. Also, the rate or amplitude of oscillation of the material-delivery funnels may be adjustably varied as described, or the crank mechanism may be rendered inoperative if desired for certain materials by adjusting the eccentric hub 132 to a position concentric with its supporting disk 136. Likewise, with some materials, the tapping mechanism may be rendered inoperative by merely unhooking the spring 184 and moving the tapper rod 170 out of engagement with the funnel.

From the above description, it will be observed that the present weighing machine is particularly adapted for feeding materials which flow with difficulty and which have a tendency to pack together and adhere to the surfaces of the machine through which they are guided, the present feeding mechanism operating to separate the material into relatively small particles forming a substantially uniform stream to be introduced into the cartons to be filled. It will be understood that the present feeding mechanism may be used with advantage in feeding materials other than those herein particularly specified, and that the present invention may be embodied in other types of carton-filling or weighing machines for feeding non-freely-flowing materials. It will be observed that because the funnel is made an integral part of the vibrator its vibration loosens any material trapped above the shutters which would therein bridge.

While the preferred embodiment of the invention has been herein illustrated and described, it will be understood that the invention may be embodied in other forms within the scope of the following claim.

Having thus described the invention, what is claimed is:

For use with a weighing machine, material feeding mechanism designed particularly for feeding non-freely flowing and packable material in a uniform stream comprising a vertical feed pipe of uniform cross-sectional area throughout its length supporting a column of material, a horizontally disposed elongated vibratory feeding conduit arranged to receive the material at one end thereof and having a discharge opening in its bottom wall at the other end thereof, a horizontally disposed sieve disposed within and secured to the horizontal vibratory feeding conduit at the receiving end only of the conduit and in spaced relation to the bottom wall thereof, said screen being disposed a short distance beneath the end of said feed pipe, said pipe being mounted to oscillate through a short arc in a direction lengthwise of the vibratory conduit to rub the end of the column of material against the sieve, means for imparting relatively slow oscillation to the pipe about a horizontal axis, and means for simultaneously imparting high freequency vibration to the horizontal feeding conduit to effect a uniform progressive movement of finely divided material horizontally through the conduit and toward the discharge end of the conduit, whereby the oscillation of the pipe in the direction lengthwise of the conduit effects the gradual abrasion by the sieve of the end of the column of material supported within the pipe, and the high frequency vibration of the feeding conduit in the same general direction in cooperation with the oscillation of the column of material being abraded by the sieve effects clearing of the sieve so that as the material passes through the sieve it is converted into a uniform, finely divided and relatively free-flowing condition in the feed conduit.

References Cited in the file of this patent

UNITED STATES PATENTS

| Number | Name | Date |
|---|---|---|
| 118,513 | Cady | Aug. 29, 1871 |
| 212,849 | Heinz et al. | Mar. 4, 1879 |
| 255,275 | Frank | Mar. 21, 1882 |
| 547,398 | Hogan | Oct. 1, 1895 |
| 556,231 | Watson | Mar. 10, 1896 |
| 574,444 | Nickerson | Jan. 5, 1897 |
| 656,297 | Morris | Aug. 21, 1900 |
| 1,083,959 | Voglesong | Jan. 13, 1914 |
| 1,321,726 | Ellis | Nov. 11, 1919 |
| 1,375,988 | Walker | Apr. 26, 1921 |
| 2,055,139 | Andrews | Sept. 22, 1936 |
| 2,101,561 | Rapp | Dec. 7, 1937 |
| 2,466,386 | Curioni | Apr. 5, 1949 |
| 2,610,726 | Howard | Sept. 16, 1952 |
| 2,665,006 | Walter | Jan. 5, 1954 |